United States Patent Office 3,251,863
Patented May 17, 1966

3,251,863
STEROIDGUANYLHYDRAZONES
Siegismund Schuetz and Karl Lauenstein, Wuppertal-Elberfeld, and Hans-Guenther Kroneberg, Haan, Rhineland, Germany, assignors to Farbenfabriken Bayer Aktiengesellschaft, Leverkusen, Germany, a corporation of Germany
No Drawing. Filed Oct. 28, 1963, Ser. No. 319,583
Claims priority, application Germany, Nov. 16, 1961, F 35,371
21 Claims. (Cl. 260—397)

This invention relates to novel condensation products obtained by the reaction of steroids having more than one carbonyl function with aminoguanidine and its salts, and the non-toxic pharmaceutically acceptable salts of the reaction products. This application is a continuation in part of copending application Serial No. 237,724 filed November 14, 1962 (now abandoned).

The reaction of aminoguanidine with steroid-ketones containing only one carbonyl function is known in the literature [J. Barnett and C. J. O. R. Morris, Biochemical Journal 40, 450 (1946), and M. Pezes, J. Bartos, J. Mathieu and J. Valls, Bull. Soc. Chim., France, 488 (1958)] but only wherein the ketones reacted contained one carbonyl group in the 3- or 17-position. The reaction products were used only to make physical measurements. There is no suggestion of condensation products of steroids having more than one carbonyl function and aminoguanidine.

It has now been surprisingly found that condensation products with valuable pharmaceutical properties are obtained when steroids with more than one carbonyl function are reacted with aminoguanidine or its salts. The new compounds thus formed, which may contain free carbonyl functions, and which may be termed steroid poly-ones, possess favorable cardiac activity. In recent years, various authors have found activity on the heart muscle in adrenal cortex steroids and progesterone. Tanz and Kirby [J. Pharmacol. exp. Therap. 131, 56 (1961)] describe, for example, a cardiac assisting action for aldosterone. Hajdu and Szent-Györgi found that DOCA and progesterone augment the action of the frog heart. Similar conclusions were reached by van Arman [J. Pharmacol. exp. Therap. 124, 59 (1958)] as to progesterone and Loymes et al. [Can. J. Med. Sci. 30, 325 (1952)] as to pregnenolone, pregnanedione and DOCA. The positive inotropic action of the named compounds on the heart or determined heart muscle sections (areola, papillary muscle) is very weak and only in relatively high concentration and under special experimental conditions as it detected. Consequently, in their therapeutic application there come into the foreground the specific activity on the electrolyte metabolism or the uterus mucosa. The pharmacologically demonstrable and evident favorable cardiac action does not appear for all practical purposes. On the other hand, it is now shown that by the introduction of the guanyl hydrazone radical into the molecule the at best indicated cardiac activity in the starting material is importantly intensified and qualitatively and quantitatively is so favorably modified that use as medication for the treatment of heart diseases is possible. By this chemical modification of the hormone molecule there is thus obtained a strong, therapeutically utilizable cardiac action.

Furthermore, they have antiphlogistic and antirheumatic properties, and their typical activity differs considerably from that of the carbonyl compounds used as starting materials; in addition, they have the advantage as compared to the latter of being water soluble in the form of suitable salts. The new condensation products are formulated with carriers into pharmaceutical compositions whereof they constitute essential active ingredients.

The products of the invention are useful as such and in the form of their salts with non-toxic inorganic or organic acids. Suitable acids are, for example, hydrochloric acid, phosphoric acid, acetic acid, propionic acid, maleic acid, fumaric acid, succinic acid, tartaric acid, citric acid, salicyclic acid, naphthalene-1,5-disulfonic acid, etc.

The preparation of the new compounds is carried out either by reacting steroids having more than one carbonyl function with aminoguanidine or by introducing the aminoguanidine radical stepwise. In the latter method the carbonyl compounds mentioned are either transformed with hydrazine into hydrazones which are then reacted with cyanamide, or the corresponding thiosemicarbazones are first produced and subsequently the sulfur atom is exchanged for the imino group by the action of ammonia in a manner per se known.

Suitable starting materials for the process of the invention are, for example,

Androst-4-ene-3,17-dione;
Pregn-4-ene-3,20-dione;
17,21-dihydroxypregn-4-ene-3,11,20-trione;
11β-17,21-trihydroxypregn-4-ene-3,20-dione;
17,21-dihydroxypregna-1,4-diene-3,11,20-trione;
11β-17,21-trihydroxy-pregna-1,4-diene-3,20-dione;
17,21-dihydroxy-pregn-4-ene-3,20-dione;
11β-17-dihydroxy-6-methyl-9-fluoro-pregna-1,4-diene-3,20-dione;
11β-17,21-trihydroxy-9α-fluoro-16-methyl-pregna-1,4-diene-3,20-dione;
11β-16,17,21-tetrahydroxy-9α-fluoro-pregna-1,4-diene-3,20-dione;
12α-hydroxyprogesterone;
18-nor-progesterone;
D-homoprogesterone;
15α-hydroxyprogesterone;
D-nor-progesterone;
3-5-cyclo-6,20-pregnene-dione;
6α- and 6β-hydroxy-progesterone;
19-hydroxyprogesterone;
B-nor-progesterone;
11,21-dihydroxyprogesterone;
9α-halogen-corticosterone;
9α-halogen-cortisone;
6α-halogen-16α,17α-dihydroxyprogesterone;
6α-methyl-16α,17α-dihydroxyprogesterone;
12α-halogen-cortisone;
9α-halogen-hydrocortisone;
12α-halogen-hydrocortisone;
16α-hydroxy-cortisone;
16α-hydroxy-prednisolone;
16α-hydroxyprednisone;
9α-halogen-16α hydroxyhydrocortisone;
12α-halogen-16-hydroxyhydrocortisone;
12α-halogen-16-hydroxycortisone;
6α-methyl-16α-hydroxycortisone;
6α-methyl-16α-hydroxyprednisolone;
6α-methyl-16α-hydroxyprednisone;
2α-methyl-16α-hydroxycortisone;
2α-methyl-16α-hydroxyhydrocortisone;
2-methyl-16α-hydroxyprednisolone;
2-methyl-16α-hydroxyprednisone;
2α,6α-dimethyl-16α hydroxycortisone;
2α,6α-dimethyl-16α-hydroxyhydrocortisone;
9α-halogen-2-methyl-16α-hydroxyprednisolone;
9α-halogen-6α-methyl-16α-hydroxyhydrocortisone;
9α-halogen-6α-methyl-16α-hydroxyprednisolone;
16-hydroxy-6-dehydrocortisone;
16α-hydroxy-6-dehydrocortisone;
16α-hydroxy-6-dehydroprednisolone;
9α-halogen-16α-hydroxy-6-dehydroprednisolone;

11β-16α,17α-trihydroxyprogesterone;
11-keto-16α,17α-dihydroxyprogesterone;
11β,16α,17α-trihydroxy-1-dehydroprogesterone;
11-keto-16α,17α-dihydroxyprogesterone;
9α-halogen-11β,16α,17α-trihydroxyprogesterone;
9α-halogen-16α,17α-dihydroxy-11-ketoprogesterone;
9α-halogen-11β,16α,17α-trihydroxy-1-dehydroprogesterone;
12α-halogen-11β,16α,17α-trihydroxyprogesterone;
12α-halogen-11β,16α,17α-trihydroxy-1-dehydroprogesterone;
21-halogen-11β,16α,17α-trihydroxyprogesterone;
9α,21-dihalogen-11β,16α,17α-trihydroxyprogesterone;
9α,21-dihalogen-6α-methyl-11β,16α,17α-trihydroxy-1-dehydroprogesterone;
16α-hydroxy-12α-alkyl(methyl)-hydrocortisone;
16-hydroxy-12α-alkyl(methyl)-cortisone;
16α-hydroxy-9α-methyl-hydrocortisone;
16α-hydroxy-9α-methyl-cortisone;
16α-hydroxy-12α-methyl-prednisolone;
16α-hydroxy-12α-alkyl-prednisone;
16α-hydroxy-9α-alkyl(methyl)-prednisolone;
16α-hydroxy-9α-alkyl-prednisone;
12α-alkyl-11β,16α,17α-trihydroxyprogesterone;
9α-alkyl-11β,16α,17α-trihydroxyprogesterone;
12α-alkyl-11-keto-16α,17α-dihydroxy-progesterone;
9α-alkyl-11-keto-16α,17α-dihydroxy-progesterone;
12α-alkyl-Δ$^{4,6}$-pregnadien-11β,16α,17α-triol-3,20-dione;
9α-alkyl-Δ$^{4,6}$-pregnadien-11β,16α,17α-triol-3,20-dione;
12α-alkyl-Δ$^{1,4}$-pregnadien-11β,16α,17α-triol-3,20-dione;
9α-alkyl-Δ$^{1,4}$-pregnadien-11β,16α,17α-triol-3,20-dione;
12α-alkyl-Δ$^{1,4}$-pregnadien-16α,17α-diol-3,11,20-trione;
9α-alkyl-Δ$^{1,4}$-prednadien-16α,17a-diol-3,11,20-trione;
9α-alkyl-Δ$^{1,4,6}$-pregnatrien-11β,16α,17α-diol-3,20-dione;
12α-alkyl-Δ$^{1,4,6}$-pregnatrien-11β,16α,17α-triol-3,20-dione;
12α-alkyl-Δ$^{4}$-pregnen-11α,16α,17α,21-tetrol-3,20-dione;
9α-alkyl-Δ$^{4}$-pregnen-11α,16α,17α,21-tetrol-3,20-dione;
12α-alkyl-Δ$^{1,4}$-pregnadien-11α,16α,17α,21-tetrol-3,20-dione;
9α-alkyl-Δ$^{1,4}$-pregnadien-11α,16α,17α,21-tetrol-3,20-dione;
12α-alkyl-Δ$^{4}$-pregnen-11α,16α,17α-triol-3,20-dione;
9α-alkyl-Δ$^{4}$-pregnen-11α,16α,17α-triol-3,20-dione;
12α-alkyl-Δ$^{1,4}$-pregnadien-11α-16α,17α-triol-3,20-dione;
9α-alkyl-Δ$^{1,4}$-pregnadien-11α,16α,17α-triol-3,20-dione
and corresponding esters.

The named compounds of the pregnane series constitute only some examples of substances suitable as starting materials. Likewise, analogous compounds of the androstane series yield products with cardiac activity. In addition, as starting materials for the process of the invention are very generally suitable those steroids which are nuclearly substituted in any position such as 1,3-, 1,5-, 1,6-, 1,7-, 1,11-, 1,12-, 1,15-, 1,17-, 2,3-, 2,5-, etc. and/or in a condensed sidechain more as a keto- or aldehydic-carbonyl group. Moreover, it is immaterial which steric series these steroids belong to. As in the pregnane series already mentioned, it can be a matter of homo-nor- as well as cyclo-compounds, and single carbon atoms of the sterol structure can be substituted by a heteroatom like N, O or S. The sterol structure can, moreover, in any manner, be further substituted by a suitable radical such as OH, acyloxy, alkoxy,

wherein R and R$_1$ are members selected from the group consisting of hydrogen and alkyl groups containing 1–4 carbon atoms, NO$_2$, CN-halogen, alkyl-alkenyl, alkinyl, SH-, S-alkyl, S-acyl and so forth or also by an alicyclic condensed ring.

The invention is illustrated by the following nonlimitative examples.

*Example 1*

11.7 grams of aminoguanidin hydrogen carbonat are dissolved in 300 milliliters of about 1 N methanolic hydrochloric acid. A solution of 5 grams of pregn-4-ene-3,20-dione in 200 milliliters of methanol is added an the mixture is stirred for sixty-four hours at room temperature. The precipitate formed is filtered off with suction and recrystallized from water after the addition of some methanol. Yield: 4.5 grams of 3,20-bis-guanylhydrazone-dihydrochloride of pregn-4-ene-3,20-dione of melting point 330° C. to 333° C.

*Example 2*

3,20-bis-guanylhydrazone of 17,21-dihydro-pregn-4-ene-3,11,20-trione is prepared in a manner analogous to Example 1. The salt obtain is dissociated and the dihydrochloride is reprecipitated from alcohol. Decomposition commences at 260° C.

*Example 3*

15 grams of 17,21-dihydroxy-pregna-1,4-diene-3,11,20-trione are dissolved in methanol, and a solution of 35 grams of aminoguanidine hydrogen carbonate in about 1000 milliliters of 1 N methanolic hydrochloric acid is added. The mixture is left standing at room temperature for seventy hours. It is then neutralized with sodium bicarbonate and evaporated under nitrogen in vacuum. The residue is dissolved in dilute acetic acid and made alkaline with sodium hydroxide. The precipitated base is filtered off with suction, washed with water and the dihydrochloride is precipitated from ethanol/ether; it can be reprecipitated from methanol/ether. Yield: 11.5 grams of 3,20-bis-guanylhydrazone-dihydrochloride of 17,21-dihydroxy-pregna-1,4-diene-3,11,20-trione of melting point 300° C.

*Example 4*

3,20-bis-guanylhydrazone-dihydrochloride of 11β,17,21-trihydroxy-pregna-1,4-diene-3,20-dione of melting point 234° C. to 236° C. is prepared in a manner similar to Example 3.

*Example 5*

A solution of 3 grams of 17-oxyprogesterone in methanol is admixed with a solution of 35 grams of aminoguanidine hydrogen carbonate in methanolic HCl of pH 2 and stirred for seventy hours at room temperature. The precipitate which forms is separated, neutralized with sodium bicarbonate and reduced to dryness under nitrogen. The residue and the previously obtained material are combined and recrystallized from water/ethanol. There results 3.4 grams of 3,20-bis-guanylhydrazone of 17-hydroxy-pregn-4-ene-3,20-dione of melting point 317° C. to 318° C.

In analogous manner there are obtained: 3,17-bis-guanylhydrazone of androst-4-ene-3,17-dione, which commences to melt at 260° C., and 3,20-bis-guanylhydrazone of 3,20-pregnane-dione of fusion point 330° C. to 333° C.

*Examples 6 through 8*

In a manner analogous to Example 1, there are produced:

(6) 3,20-bis-guanylhydrazone of 11α-hydroxy-pregn-4-ene-3,20-dione. The dihydrochloride is crystallized from a mixture of ethanol and water and has a fusion point of 358° C. to 359° C.

(7) 3,20-bis-guanylhydrazone of 4-chlor-pregn-4-ene-3,20-dione. The dihydrochloride melts after recrystallization from methanol/water at 334° C. to 336° C.

(8) 3,20-bis-guanylhydrazone of 5α-cyano-pregnane-3,20-dione. The dihydrochloride is recrystallized from ethanol/water and fuses at 350° C. to 351° C.

*Example 9*

In a manner analogous to Example 3, there is obtained bis-guanylhydrazone of 2-hydroxy-methylene-17α-methyl-androst-4-en-17β-ol-3-one. The dihydrochloride crystallizes from methanol/acetone with one mole of methanol. Fusion point: 196° C. to 200° C.

Example 10

In analogous fashion to Example 5 there are obtained: 3,17-bis-guanylhydrazone of androst-4-ene-3,17-dione, whose dihydrochloride commences to melt at 260° C.

3,20-bis-guanylhydrazone of 3,20-pregnanedione (dihydrochloride) fusing at 330° C. to 333° C.

Bis-guanylhydrazone of 2-hydroxy-methylene-testosterone. The dihydrochloride crystallizes from methanol with one mole of the solution medium. Fuses at 228° C. to 230° C.

Example 11

To a solution of 1 gram of aminoguanidine hydrogen carbonate in methanolic HCl (pH=2) there is added a solution of 1.1 grams of 4-chlorandrost-4-ene-3,17-dione in methanol and the solutions are allowed to stand for three days at room temperature under nitrogen. Then the reaction mixture is stirred into 1 liter of ether, the resulting precipitate suction filtered, boiled with acetone and recrystallized from alcohol/acetone. Yield: 1 gram of the dihydrochloride of 4-chlorandrost-4-ene-3,17-bisguanyl hydrazone of melting point 249° C. to 251° C. (decomp.).

In analogous manner there were produced:

The dihydrochloride of androstan-3,17-bisguanyl hydrazone of melting point 288° C. to 290° C. (decomp.).

The dihydrochloride of 5-α-cyanoandrostan-3,17-bisguanyl hydrazone of melting point 270° C. to 272° C. (decomp.).

The dihydrochloride of androsta-1,4-diene-3,17-bisguanyl hydrazone of melting point 288° C. to 290° C. (decomp.).

The dihydrochloride of 6-β-hydroxypregna-4,14-diene-3,20-bisguanyl hydrazone of melting point 252° C. to 254° C. (decomp.).

The dihydrochloride of 9α-fluorpregna-1,4-diene-11β,16α-17α,21-tetrol-3,20-bisguanyl hydrazone of melting point 235° C. to 237° C. (decomp.).

The dihydrochloride of 9α-fluoro-16α-methylpregna-1,4-diene-11β,17α,21-triol-3,20-bisguanyl hydrazone of melting point 253° C. to 255° C. (decomp.).

The dihydrochloride of androst-4-ene-11-one-3,17-bisguanyl hydrazone of melting point 279° C. to 281° C. (decomp.).

The dihydrochloride of pregn-5-ene-3β-ol-7,20-bisguanyl hydrazone of melting point 263° C. to 265° C. (decomp.).

The dihydrochloride of 19-nor-androst-4-ene-3,17-bisguanyl hydrazone of melting point 258° C. to 260° C. (decomp.).

The dihydrochloride of pregna-3,5-diene-7,20-bisguanyl hydrazone of melting point 268° C. (decomp.).

The trihydrochloride of pregnano-3,6,20-trisguanyl hydrazone of melting point 257° C. (decomp.).

Example 12

2.2 grams of 3-(1-pyrrolidino)-pregna-3,5-diene-20-one are dissolved under warming in 200 milliliters of absolute ethanol and admixed with a solution of 0.9 gram of aminoguanidine hydrogen carbonate in methanolic HCl of pH 2. This is allowed to stand for twelve hours at room temperature, 1 liter of ether stirred in, the resulting flakes filtered out and crystallized from methanol under addition of acetone. Yield: 2 grams of the dihydrochloride of 3-(1-pyrrolidino)-pregna-3,5-diene-20-guanyl hydrazone of melting point 263° C. to 265° C. (decomp.).

1 gram of this salt is dissolved in water, the solution adjusted with dilute soda lye and stirred two hours at room temperature. The precipitate is suction filtered, washed with neutral water and recrystallized from alcohol. Yield: 0.5 gram of pregn-4-ene-3-one-20-guanyl hydrazone of melting point 246° C. to 248° C. (decomp.).

Example 13

2.86 grams of androst-4-ene-3,17-dione are added to a solution of 0.78 gram of potassium in 30 milliliters of tertiary butanol. This is stirred for one hour under nitrogen and under cooling, 2.68 milliliters of isoamylnitrite added dropwise. The reaction mixture is stirred for twelve more hours at room temperature, diluted with water and shaken several times with ether. The aqueous phase is filtered over animal charcoal and acidified with dilute acetic acid. The resulting flakes are separated, washed with acid-free water and recrystallized from methanol. Yield: 0.8 gram of dinitroso-androst-4-ene-3,17-dione of melting point 222° C. to 224° C. (decomp.). 0.5 gram of aminoguanidine hydrogen carbonate are dissolved in methanolic HCl (pH=2) and there is added thereto a solution of 0.5 gram of the dinitroso-androst-4-ene-3,17-dione in methanol and the reaction solution allowed to stand for three days at room temperature under nitrogen. Then there is stirred in 1 liter of ether and the precipitate filtered out, boiled out with acetone and recrystallized from alcohol-acetone. Yield: 0.5 gram of the dihydrochloride of dinitroso-androst-4-ene-3,17-bisguanyl hydrazone of melting point 180° C. to 183° C. (decomp.).

Example 14

3.14 grams of pregn-4-ene-3,20-dione are added to a solution of 0.78 gram of potassium in 30 milliliters of tertiary butanol and stirred under nitrogen for one hour. Then 2.68 milliliters of isoamylnitrite are added dropwise under cooling and stirred for twelve more hours at room temperature. The reaction mixture is diluted with water and shaken repeatedly with ether. The aqueous phase is filtered over animal charcoal and acidified with dilute acetic acid. The resulting flakes were separated, washed with acid-free water and recrystallized from methanol. Yield: 1 gram of dinitroso-pregn-4-ene-3,20-dione of melting point 208° C. to 210° C. (decomp.).

1 gram of aminoguanidine hydrogen carbonate is dissolved in methanolic HCl (pH=2) and mixed with a solution of 1 gram of the dinitroso-pregn-4-ene-3,20-dione. The reaction solution is allowed to stand for three days under nitrogen at room temperature, neutralized with sodium bicarbonate, the solvent distilled off in vacuo, the residue triturated with a little water, the remaining sediment suction filtered and crystallized from alcohol under addition of ether. Yield: 1 gram of the dihydrochloride of dinitroso-pregn-4-ene-3,20-bisguanyl hydrazone of melting point 260° C. to 264° C. (decomp.).

Example 15

3 grams of aminoguanidine hydrogen carbonate are dissolved in methanolic HCl (pH=2). A solution of 3.2 grams of pregn-4-en-21-ol-3,20-dione in 100 milliliters of methanol is added and stirred for three days at room temperature. The precipitate which forms is suction filtered and recrystallized from methanol under addition of some water. Yield: 3 grams of the dihydrochloride of pregn-4-en-21-ol-3,20-bisguanyl hydrazone of melting point 284° C. to 286° C. (decomp.).

In analogous manner there are obtained:

The dihydrochloride of 3,20-bisguanyl hydrazone of melting point 290° C. to 292° C. from 17,21-dihydroxy-pregn-4-ene-3,20-dione; and The 3,20-bisguanyl hydrazone dihydrochloride of 16,17-dihydroxy-pregn-4-ene-3,20-dione of melting point 284° C. to 287° C. from 16,17-epoxy-pregn-4-ene-3,20-dione.

Example 16

0.4 gram of aminoguanidine hydrogen carbonate is dissolved in methanolic HCl (pH=2). There is added thereto a solution of 0.4 gram of B-nor-pregn-4-ene-3,20-dione in 20 milliliters of methanol. Stirring is carried out for three days at room temperature. The resulting precipitate is suction filtered and washed with acetone and ether.

Yield: 0.4 gram of the dihydrochloride of B-nor-pregn-4-ene-3,20-bisguanyl hydrazone of melting point 340° C. to 342° C. (decomp.).

In analogous manner there is obtained from pregn-4-ene-[2,3]-cyclohex-4'-ene-3',20-dione, the dihydrochloride of 3',20-bisguanyl hydrazone of melting point 320° C. to 321° C. (decomp.).

Example 17

To a solution of 0.8 gram of aminoguanidine hydrogen carbonate in methanolic HCl (pH=2), there is added a solution of 1 gram of cholestan-3,6-dione in 300 milliliters of methanol and allowed to stand for three days at room temperature under nitrogen. Then 1 liter of ether is stirred into the reaction solution, the resulting precipitate suction filtered, boiled with acetone and recrystallized from alcohol-acetone. Yield: 0.5 gram of the dihydrochloride of cholestan-3,6-bisguanyl hydrazone of melting point 228° C. to 230° C. (decomp.).

In analogous manner there were obtained:

The dihydrochloride of androsta-3,5-diene-7,17-bisguanyl hydrazone of melting point 285° C. to 288° C. (decomp.).

The dihydrochloride of 9α-fluoro-11β,16α,17α-trihydroxy-17α,β-hydroxymethyl-D-homo-androsta-1,4-diene-3,17-bisguanyl hydrazone of melting point 244° C. to 248° C. (decomp.).

The dihydrochloride of A-nor-pregn-3-ene-2,20-bisguanyl hydrazone.

The trihydrochloride of pregn-4-ene-3,6,20-trisguanyl hydrazone of melting point 275° C. (decomp.).

The dihydrochloride of 5β-pregnan-12α-acetoxy-3,20-bisguanyl hydrazone of melting point 235° C. to 238° C. (decomp.).

The hydrochloride of aldosterone guanyl hydrazone.

The bisguanyl hydrazone of 2-hydroxymethylene-pregn-4-en-20β-ol-3-one. The dihydrochloride crystallizes from alcohol with one mole of solvent (melting point 205° C. to 207° C.) (decomp.).

The dihydrochloride of 3,5 - cyclo - androstan - 6,17-bisguanyl hydrazone of melting point 284° C. to 285° C.

Bisguanyl hydrazone of 16-hydroxymethylene-androst-5-en-3β-ol-17-one. The dihydrochloride crystallizes from alcohol with 1 mole of solvent. [Melting point 193° C. to 195° C. (decomp.).]

The trihydrochloride of 3',3,20-trisguanyl hydrazone of pregn - 4 - ene - 2 - (3' - ketobutyl) - 3,20 - dione of melting point 235° C. to 237° C. (decomp.).

The dihydrochloride of 3,3'-bisguanyl hydrazone of androst - 4 - en - 2 - (3' - ketobutyl) - 17β - ol - 3 - one of melting point 222° C. to 224° C. (decomp.).

Likewise there can be obtained from 17-formyl-Δ⁴-androstene-3-one the bisguanyl hydrazone dihydrochloride.

Example 18

1 gram of androst - 4 - en - 2 - (3' - ketobutyl) - 17β-ol-3-one is dissolved in 50 milliliters of glacial acetic acid and mixed at 10° C. with 25 milliliters of a 2 percent CrO₃ solution in glacial acetic acid incrementally. After further stirring for two hours at room temperature the solvent is then distilled off in vacuo. The residue is dissolved in chloroform, washed with 2 N sulfuric acid, washed with neutral water and dried over sodium sulfate. The residue left after distilling off the solvent consists of androst - 4 - ene - 2 - (3' - ketobutyl) - 3,17-dione. This crude product is dissolved in 30 milliliters of methanol and mixed with a solution of 1.2 grams of aminoguanidine hydrogen carbonate in methanolic HCl (pH=2). This is allowed to stand three days at room temperature, 0.5 liter of ether is stirred into the reaction solution, the resulting precipitate is filtered out, boiled out with acetone, precipitated from alcohol/acetone and boiled with a little alcohol. Yield: 0.8 gram of the trihydrochloride of 3,3',17-trisguanyl hydrazone of androst-4 - ene - 2 - (3' - ketobutyl) - 3,17 - dione which crystallizes from alcohol with 1 mole of solvent [melting point 233° C. to 235° C. (decomp.)].

Example 19

1.4 grams of androst - 4 - ene - [2,3] - cyclohex - 4'-en-17β-ol-3'-one are dissolved in 65 milliliters of glacial acetic acid and 32 milliliters of a 2 percent CrO₃-glacial acetic acid are added dropwise at 10° C. After further stirring for two hours at room temperature the solvent was distilled off in vacuo. The residue is dissolved in chloroform, washed with 2 N sulfuric acid, washed with neutral water and dried over sodium sulfate. After the distillation of the solvent there is obtained androst-4-ene - [2,3] - cyclohex - 4' - en - 3',17 - dione. This is dissolved in 30 milliliters of methanol and mixed with a solution of 1 gram of aminoguanidine hydrogen carbonate in methanolic HCl (pH=2). This is allowed to stand for three days at room temperature, ether is stirred into the reaction solution, the resulting precipitate suction filtered off, boiled out repeatedly with acetone and precipitated from alcohol/acetone. Yield: 1.5 grams of androst - 4 - ene - [2,3] - cyclohex - 4' - ene - 3',17-bisguanyl hydrazone of melting point 263° C. to 265° C. (decomp.).

Example 20

2 grams of 2 - hydroxymethylene - pregn - 4 - en - 20β-ol-3-one is dissolved in 20 milliliters of absolute benzol, 0.5 milliliter of methyl vinyl ketone and 10 drops of triethylamine are added thereto and let stand for five days at room temperature, followed by dilution with 100 milliliters of benzol, repeated shaking of the solution with 5 percent soda solution, washing with neutral water and drying over sodium sulfate. The residue remaining after distilling off the solvent consists of pregn-4-ene-2-(3'-ketobutyl)-20β-ol-3-one. This is dissolved in 20 milliliters of methanol and mixed with a solution of 0.9 gram of aminoguanidine hydrogen carbonate in methanolic HCl, left to stand for three days at room temperature, ether stirred in, the resulting precipitate filtered off, boiled out repeatedly with acetone and crystallized from alcohol/acetone. Yield: 0.8 gram of the dihydrochloride of 3,3'-bisguanyl hydrazone of pregn-4-ene-2-(3'-ketobutyl)-20β-ol-3-one of melting point 218° C. to 220° C. (decomp.).

Example 21

5 grams of 16 - hydroxymethylene - androst - 5 - en-3β-ol-17-one are suspended in 20 milliliters of absolute benzol and mixed with 2 milliliters of methyl vinyl ketone and 10 drops of triethylamine, stirred five days at room temperature, diluted with 100 milliliters of benzol, filtered and the filtrate shaken a short time with 5 percent soda solution, then washed with neutral water and dried over sodium sulfate. After distilling off the solvent there is obtained androst - 5 - ene - 16 - (3' - ketobutyl) - 3β-ol-17-one. This is dissolved in 20 milliliters of methanol and mixed with a solution of 0.9 gram of aminoguanidine hydrogen carbonate in methanolic HCl (pH=2), left to stand for three days at room temperature, 0.5 liter of ether poured in, the resulting precipitate filtered off and boiled out with acetone and ethanol. Yield: 0.5 gram of the dihydrochloride of 3',17-bisguanyl hydrazone of androst - 5 - ene - 16 - (3' - ketobutyl) - 3β - ol - 17 - one of melting point 215° C. to 217° C. (decomp.).

Example 22

0.65 gram of aminoguanidine hydrogen carbonate are dissolved in methanolic HCl (pH=2). To the solution there is added a solution of 0.7 gram 5β-pregnan-12α-ol-3,20-dione in methanol. After three days under nitrogen at room temperature the mixture is poured into ether and the resulting precipitate is suction filtered, washed with acetone and crystallized from alcohol/acetone. Yield: 0.4 g. of the dihydrochloride of 5β-pregnan-12α-ol-3,20- bis-guanyl-hydrazone of melting point 280–282° (decomp.).

In analogous manner there are obtained: the dihydrochloride of androst - 4 - en - [16,17] - cyclohex - 17(20)-ene-3,20-bisguanylhydrazone of melting point 267–270° (decomp.); the dihydrochloride of pregn-4-ene-11α,17α-diol-3,20-bis-guanylhydrazone of melting point 300–302° (decomp.); the dihydrochloride of the 3,17-bisguanylhydrazone of - 17 - formyl - androst - 4 - 3 - one of melting point 312°.

What is claimed is:

1. A compound selected from the group consisting of a bis- and tris-guanylhydrazone of pregnan and androstan derivatives and a non-toxic pharmaceutically acceptable acid salt thereof.
2. 3,20-bis-guanylhydrazone of pregn-4-ene-3,20-dione.
3. 3,20-bis-guanylhydrazone of 17,21-dihydroxy-pregn-4-ene-3,11,20-trione.
4. 3,20 - bis - guanylhydrazone of 17,21 - dihydroxy-pregna-1,4-diene-3,11,20-trione.
5. 3,20-bis-guanylhydrazone of 11β,17,21-trihydroxy-pregna-1,4-diene-3,20-dione.
6. 3,20-bis-guanylhydrazone of 17-hydroxy-pregn-4-ene-3,20-dione.
7. 3,17-bis-guanylhydrazone of androst-4-ene-3,17-dione.
8. 3,20-bis-guanylhydrazone of 3,20-pregnanedione.
9. 3,20-bis-guanylhydrazone of 11α-hydroxy-pregn-4-ene-3,20-dione.
10. 3,20-bis-guanylhydrazone of 4-chlor-pregn-4-ene-3,20-dione.
11. 3,20-bis-guanylhydrazone of 5α-cyano-pregnane-3,20-dione.
12. Bis-guanylhydrazone of 2-hydroxy-methylene-17α-methyl-androst-4-ene-17β-ol-3-one.
13. Bis - guanylhydrazone of 2 - hydroxy - methylene-testosterone.
14. 3,17-bis-guanylhydrazone of 4-chlorandrost-4-ene.
15. 3,20-bis-guanylhydrazone of 9α-fluorpregna-1,4-diene-11β,16α-17α,21-tetrol.
16. 3,20-bis-guanylhydrazone of 9α-fluoro-16α-methyl-pregna-1,4-diene-11β,17α,21-triol.
17. 3,17 - bis - guanylhydrazone of dinitroso - androst-4-ene.
18. 3',20-bis-guanylhydrazone of pregn-4-ene-[2,3]- cyclohex-4'-ene-3',20-dione.
19. 3,17-bis-guanylhydrazone of 9α-fluoro-11β,16α,17α-trihydroxy - 17α,β - hydroxymethyl - D - homo - androsta-1,4-diene.
20. 3',3,20 - tris - guanylhydrazone of pregn - 4 - ene-2-(3'-ketobutyl)-3,20-dione.
21. 3,3',17-tris-guanylhydrazone of androst-4-ene-2-(3'-ketobutyl)-3,17-dione.

References Cited by the Examiner

UNITED STATES PATENTS

| | | | |
|---|---|---|---|
| 2,319,012 | 5/1943 | Miescher et al. | 260—397.3 |
| 2,319,013 | 5/1943 | Miescher et al. | 260—397.3 |
| 2,387,469 | 10/1945 | Ruzicka et al. | 260—397.5 |
| 2,992,973 | 7/1961 | Terumichi | 195—51 |
| 3,076,828 | 2/1963 | Wettstein et al. | 260—397.45 |
| 3,086,920 | 4/1963 | Isono et al. | 195—51 |
| 3,118,920 | 1/1964 | Wettstein et al. | 260—397.47 |

OTHER REFERENCES

Loewenthal: Tetrahedron, vol. 6, No. 4, pp. 269–303, June 1959, page 294, relied upon.

Oliveto et al., J.A.C.S. 78, pp. 1736–38 (1956).

LEWIS GOTTS, *Primary Examiner.*